United States Patent
Chellappa

[11] Patent Number: 6,029,346
[45] Date of Patent: Feb. 29, 2000

[54] METHOD OF FABRICATING CARBON—CARBON ENGINE COMPONENT

[76] Inventor: Venkatesh Chellappa, 1999 Persimmon Ct., Schaumburg, Ill. 60193

[21] Appl. No.: 09/070,325

[22] Filed: Apr. 30, 1998

[51] Int. Cl.⁷ .................................................. C04B 33/32
[52] U.S. Cl. ................................ 29/888.04; 29/888.046; 29/888.047
[58] Field of Search ........................... 29/888.04, 888.01, 29/888.02, 888.044, 888.046, 888.047, 527.6; 264/632, 640

[56] References Cited

U.S. PATENT DOCUMENTS

| | | | |
|---|---|---|---|
| 4,683,809 | 8/1987 | Taylor | 29/888.04 |
| 5,101,556 | 4/1992 | Fluga et al. | 29/888.046 |
| 5,144,923 | 9/1992 | Leites et al. | 123/193.6 |
| 5,738,818 | 4/1998 | Atmur et al. | 364/624 |
| 5,882,575 | 3/1999 | Atmur et al. | 264/624 |
| 5,908,587 | 6/1999 | Gross et al. | 264/640 |

*Primary Examiner*—Irene Cuda
*Attorney, Agent, or Firm*—Dillis V. Allen, Esq.

[57] ABSTRACT

An internal combustion engine component assembly including piston, wrist pin, and cylinder sleeve, all constructed of a matching carbon—carbon composite is disclosed. The piston is a two-piece assembly divided in crown and skirt, each fabricated individually to optimize the most desirable properties in the respective cylinder areas in which they operate. The crown is fabricated by placing the fiber and binder into a compression mold and pyrolizing(heating) the resulting preform at a high temperature in the range of 1500 to 2000 degrees C. to achieve high temperature strength, and high thermal conductivity that continue after machining to the finished crown part. The skirt, a separate piece, on the other hand is fabricated differently to seek higher lubricity and better wear resistance along the cylinder wall with lower thermal conductivity to minimize heat loss. The skirt preform is fabricated by wrapping the fiber around a mandrel and subsequently heating and pyrolizing at temperatures far less than the heat treatment temperature of the crown preform resulting in significant time and cost saving. The skirt precursor is machined and then assembled to the crown to complete the piston. The piston skirt, the wrist pin and the cylinder sleeve are also fabricated using similar composition matching techniques to minimize tolerances between these parts. All three of these parts are separately preformed on mandrels utilizing the same wrapping angles to equate wrap strength. Then, the resulting preforms of each are preheated and pyrolized at the same temperatures to almost similar elevated temperature strength and, most importantly, coefficients of thermal expansion. This technique permits the engine designer to reduce the clearance between these parts, thereby minimize blow by, reduce lubrication requirements, and increase engine horsepower.

13 Claims, 3 Drawing Sheets

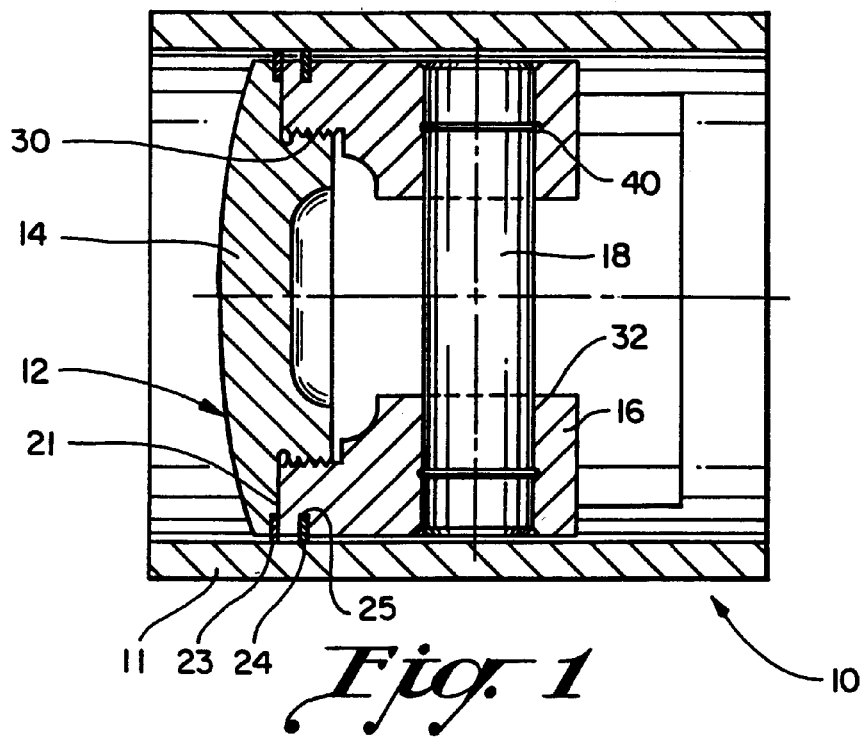
Fig. 1
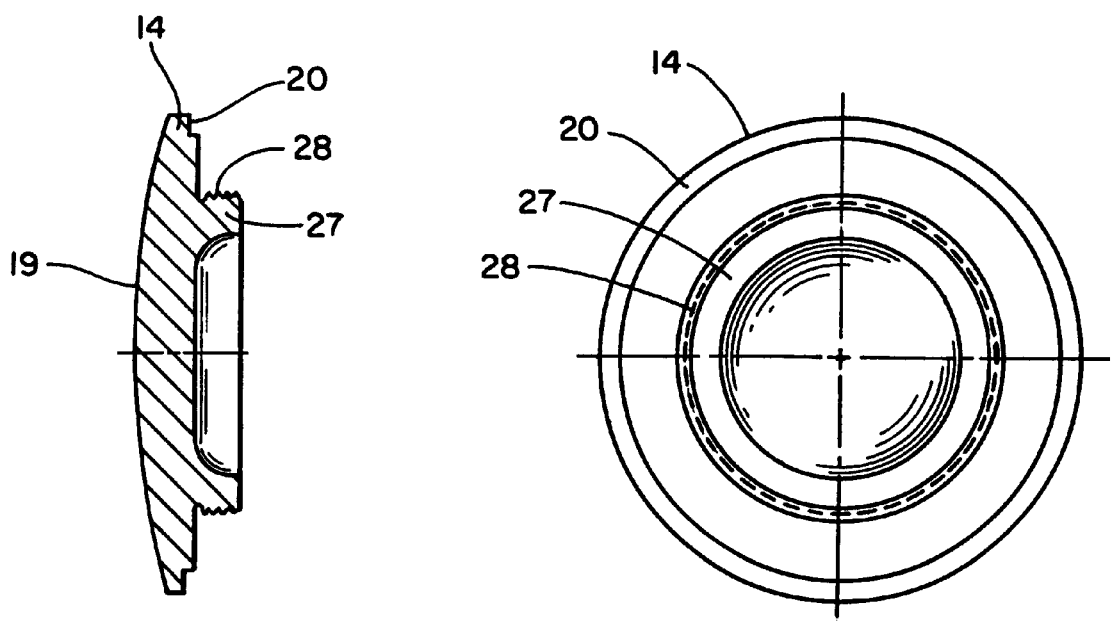
Fig. 2
Fig. 3

METHOD OF FABRICATING CARBON—CARBON ENGINE COMPONENT

BACKGROUND OF THE INVENTION

The present invention relates to the fabrication of internal combustion engine parts from carbon—carbon composites. Carbon—carbon composites are made of carbon fiber reinforced in carbon matrix.

In the past, carbon—carbon parts have been used primarily in aeronautical and space applications because of their light-weight and high temperature properties. However, these characteristics are also extremely beneficial in industrial and automotive engines as evidenced by the fact that aluminum pistons(density 2.7 $g/cm^3$), which are also lighter than steel(8.0 $g/cm^3$), but heavier than carbon—carbon(1.7 $g/cm^3$), have achieved significant commercial success in these markets. However, aluminum has a number of disadvantages. The relative difference in thermal strength and coefficient of thermal expansion of the aluminum pistons with other mating engine components, require large clearances between the piston and the adjacent walls to eliminate interference and galling between the piston and the cylinder wall and the wrist pin. To improve engine efficiency, piston rings are used in these aluminum pistons to seal the gap between the piston and the cylinder wall. In fact, multiple rings with staggering gaps are required to prevent high pressure leakage and possible piston erosion from local high flow rates at the rings, piston and cylinder wall inner face. Because of the poor, high temperature strength of aluminum, it has been found necessary to lower the piston rings from the crown to prevent the rings from sticking in the ring grooves, and this has resulted in unburned hydrocarbon build-up in the space around the piston above the ring yielding reduced engine efficiency, noting that aluminum melts at 660 degrees C.(and the maximum application temperature is 300 degrees C.), which is well below the typical combustion engine temperature. Also, large amounts of lubricant are required to reduce the piston and cylinder wall temperature and wear rates in aluminum piston assemblies.

The carbon—carbon components are desirable in this environment because of their resistance to high temperature and thermal shocks, coupled with high temperature strength. In some cases, the carbon—carbon piston can eliminate the necessity of piston rings because of the negligible coefficient of thermal expansion of carbon—carbon(1–2 ppm), which is far less than aluminum(18–20 ppm). Even at high temperatures, the carbon—carbon parts uniquely maintain strength, allowing the piston to operate at both higher temperature and higher pressure than metal pistons. Thermal efficiency of the engine is also improved because of the high emittance and low thermal efficiency of carbon—carbon, resulting in less heat loss into the piston and the cooling system.

The carbon fibers in the carbon—carbon composite are known as precursors, and there are three different types; namely, rayon, polyacrylonitrile, and pitch. Rayon has been largely abandoned in recent years because of the resulting poor quality fibers so that today fibers are predominantly made from P.A.N.(polyacrylonitrile) or pitch. P.A.N. is preferred for high strength, whereas pitch derivatives are desirable for high modulus and high thermal conductivity.

In reality, however, the use of carbon—carbon composites in engine components in the industrial and automotive market has not been extensive primarily for two reasons. The first is cost. In the early 1990's, carbon fiber used to cost about $40/lb., and now costs $8–$9/lb., and the near term projections are for under $5/lb. This cost reduction and an increased demand for fibers, which is projected, should drive the fiber cost down further making the carbon—carbon composites a very strong engineering material to replace steel and aluminum in many applications.

The second reason why carbon—carbon composites have not achieved great commercial success is the inability of fabricators to optimize and reduce the cost of the fabrication process. This is due in part to the difficulties in processing techniques to convert the binder to complete carbon which can hold the fibers, so the fibers therein reinforce the binder in such a way to have suitable engineering properties. Traditional processing consists of mixing the fiber with resin and preform into the desired shape. These preforms are kept in a high temperature furnace and heat treated for several hours ranging from 800 to 2000 degrees C. After firing, the composites are placed in a CVD furnace and densified. CVD refers to chemical vapor deposition. Due to the nature of CVD, it is extremely difficult to fabricate thick specimens with uniform density. As such, even for thin samples the CVD process takes from a few days to several weeks to finish. The CVD is sometimes replaced by chemical vapor infiltration(CVI), which causes carbon to close on the outside walls of the preform and inhibit penetration to the inside walls. Thus, in addition to time costs, the resulting crusting problem and its removal made these processes highly labor intensive and not conducive to high volume production.

In CVD, hydrocarbon gas is sent through the preform to crack it with high heat. This breaks the carbon down from hydrogen.

Another deficiency in the prior art of carbon—carbon high temperature components is the failure to optimize the performance of the component by controlling and varying the performance characteristics at specific locations on each part. For example, a rotating shaft under load will run hotter in the area of the bearings than at a point midway between the bearings. Prior art methodology for constructing such a shaft would result in homogenous physical properties throughout the shaft, and it is this approach that has in the past contributed to the high cost and less than optimum performance for carbon—carbon composites.

The Taylor, U.S. Pat. No. 4,683,809, assigned to NASA, shows a light-weight carbon—carbon piston with no piston rings. The piston is constructed in one piece and the fibers are laid up randomly throughout the piston. The methodology of fiber lay-up tends to disburse the fibers randomly resulting in internal cracks, unreliability, and low strength. The resulting piston component is heavy with poor fracture toughness. Taylor also suggests in this patent a carbon—carbon cylinder wall 60, but is silent as to how the cylinder wall or sleeve is formed or how its performance optimized.

Another Taylor patent, also assigned to NASA, is U.S. Pat. No. 4,736,676, which discloses a composite piston structure including a carbon—carbon or ceramic piston cap 11 with a metallic piston body 13. This piston is quite complicated and too difficult to manufacture in commercial production.

A later Taylor, et al., U.S. Pat. No. 4,909,133, also assigned to NASA, discloses a carbon—carbon piston that has a tubular closed ended knitted preformed sock of carbon fibers 11 imbedded within the matrix of the piston structure on the piston crown side wall in the inside surface.

Finally, the Fluga, U.S. Pat. No. 5,154,109, discloses a method of manufacturing a piston and piston rod in which a layer of carbon fibers is triaxially braided on a mandrel with a cylindrical body. A second layer of carbon fibers is triaxially braided over the first layer. The fiber layers are spaced from one another and impregnated with a thermo set resin. The preform is unidirectional in the sense that it does not have a uniform axial diameter. These are extremely difficult to manufacture and difficult to densify using CVD. Furthermore, the design is not flexible because the whole structure is made of one type of material, and thermal expansion is difficult to predict, and in some cases, may expand obliquely.

It is the primary object of the present invention to ameliorate the problems noted above and provide an improved method and structure for fabricating carbon—carbon lightweight components intended for high temperature environments.

SUMMARY OF THE PRESENT INVENTION

In accordance with the present invention, specific internal combustion components including piston, wrist pin, and sleeve are constructed of matching carbon—carbon composites. The piston is a two-piece assembly divided in crown and skirt, each fabricated to optimize the most desirable properties into different cylinder areas in which they operate. The crown is fabricated by placing carbon fiber and carbon matrix into a compression mold and pyrolizing(heating) the resulting preform at a high temperature in the range of 1500 to 2000 degrees C. to achieve high temperature strength and high thermal conductivity that continue after machining to the finished crown part. The skirt, a separate piece, on the other hand is fabricated differently to seek higher lubricity along the crown wall with lower thermal conductivity and lower high temperature strength. The skirt preform is fabricated by wrapping fiber or fabric around a mandrel followed by successive stages of heating and pyrolizing at temperatures substantially less than the cracking temperature of the crown preform resulting in substantial time and labor savings. The skirt preform is machined and then assembled to the crown to complete the piston.

The piston skirt, the wrist pin, and the cylinder sleeve are also fabricated using a matching fabrication technique to minimize tolerances between these parts. The three parts are separately preformed on mandrels utilizing the same wrapping angles to achieve matching properties. Then, the resulting preforms of each are preheated and pyrolized at the same temperatures to almost equate the elevated temperature strength and most importantly, coefficients of thermal expansion. This technique permits the engine designer to reduce the clearances between these parts, minimize blow by, reduce lubrication requirements, and increase horsepower.

According to the present invention and based on a differential analysis of piston environment, the property requirements for the skirt are high self-lubricious properties and improved wear resistance while for the crown high thermal strength and high thermal conductivity. To achieve this, the crown is fabricated in a compression mold separately from the skirt. This permits the piston designer to select the fiber orientation in the preform for the crown and the subsequent heat treating, pyrolizing and CVD steps to best accommodate the temperature and pressure conditions above the crown. Usually, this dictates a pyrolizing temperature of about 2000 degrees C.

The skirt, on the other hand, is manufactured by wrapping fibers on a mandrel with the fiber layers running along different directions. Building the skirt on a mandrel enables a hybrid of fiber additions, such as stabilized P.A.N., low temperature pitch or a high temperature pitch fiber in such a way to tailor the properties for specific strength, thermal conductivity, and thermal expansion, etc. This usually dictates a significantly lower heat treating temperature in the range of 600 to 800 degrees C. After machining the crown and skirt, they are threaded to one another and the threads welded permanently in a heat treating furnace at 400 degrees C.

This method of fabrication has several advantages. One, it enables tailorable piston properties at different parts of the piston to achieve superior performance characteristics which is otherwise not able to achieve from prior art. Other significant advantages are production volume is significantly increased due to the smaller preforms making heat treatment and C.V.D. more efficient and less time-consuming. The lower temperature skirt curing also incrementally increases production efficiency. Separation of crown and skirt also enables the manufacturer to mix and match skirts and crowns to increase assembled part variations. A still further advantage is that this method of fabrication lends itself more to automation than prior techniques.

A binder is also used for the threads between the crown and the skirt, which may be pitch, phenolic, or any high temperature resin.

Other objects and advantages of the present invention will be more clearly apparent from the following detailed description.

BRIEF DESCRIPTION OF THE DRAWINGS

FIG. 1 is a sub-assembly of engine components according to the present invention including piston, wrist pin and cylinder sleeve;

FIG. 2 is a sub-assembly cross-section of the piston crown illustrated in FIG. 1;

FIG. 3 is a right side view of the piston crown illustrated in FIG. 2;

DETAILED DESCRIPTION OF THE PREFERRED EMBODIMENT

Figure 4:
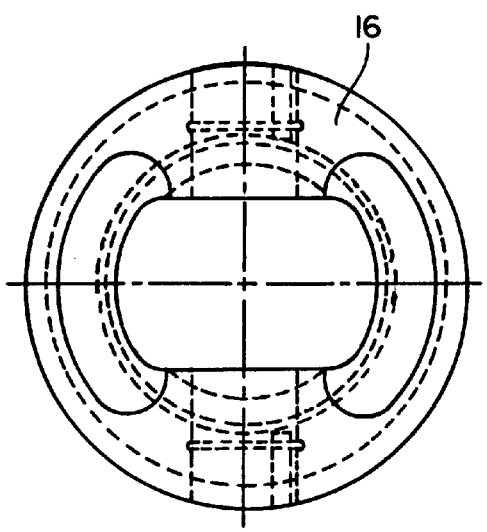
FIG. 4 is a left side view of the piston skirt illustrated in FIG. 5.
Figure 5:
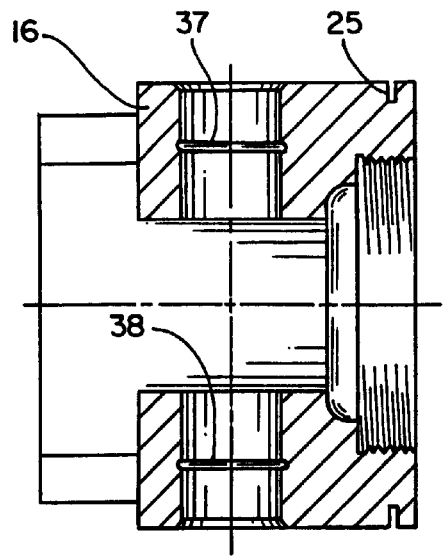
FIG. 5 is a sub-assembly longitudinal section of the piston skirt illustrated in FIGS. 1 and 4.
Figure 6:
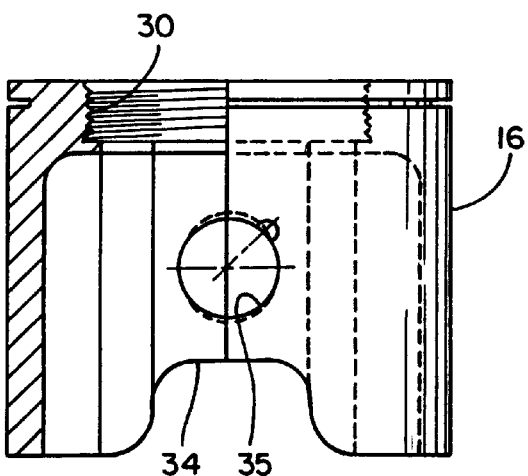
FIG. 6 is a partly fragmented sub-assembly of the piston skirt illustrated in FIGS. 1, 4 and 5, rotated 90 degrees in two orthogonal planes from the FIG. 5 view.

Referring to the drawings and particularly FIG. 1, a partial piston and cylinder assembly 10 is illustrated including a carbon—carbon cylinder sleeve 11, and a piston assembly 12 consisting of a carbon—carbon crown 14 threaded into a carbon—carbon skirt 16 carrying a carbon—carbon wrist pin 18. The crown 14 has a domed upper surface 19, a groove 20 that define with top surface 21 of the skirt 16, a groove for a piston ring 23. A second piston ring 24 is received in annular groove 25 near the top of the skirt 16. The rings 23 and 24 and the grooves 20 and 25 are positioned close to the top of the piston to reduce blow by and unburned hydrocarbons around the periphery of the piston, made possible by the high thermal conductivity and high heat strength of the crown 14.

The crown has a depending annular flange 27 that is threaded at 28 received in a threaded annular counter bore 30 in the top of the skirt 16. Skirt 16 has an enlarged through bore 32 to reduce skirt weight. Skirt 16 also has a cross recess 34, as seen in 66, in its lower surface that also contributes to weight reduction and port relief in some applications.

Figure 7:
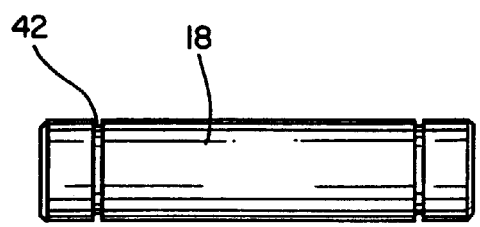
FIG. 7 is a sub-assembly of the piston wrist pin.
Figure 8:
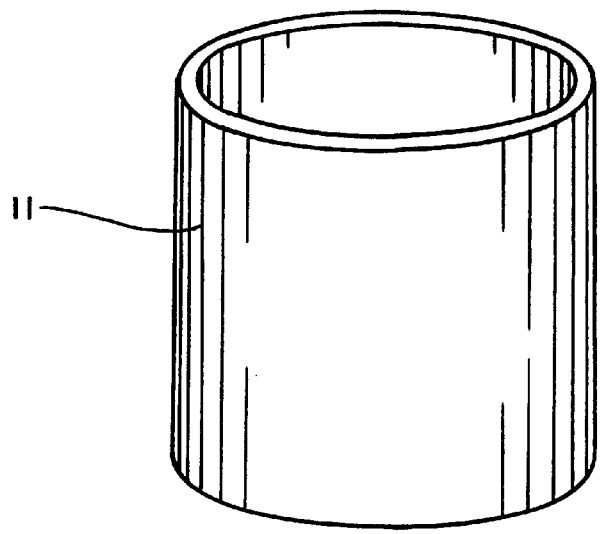
FIG. 8 is a perspective view of the cylinder sleeve illustrated in FIG. 1.
Figure 9:
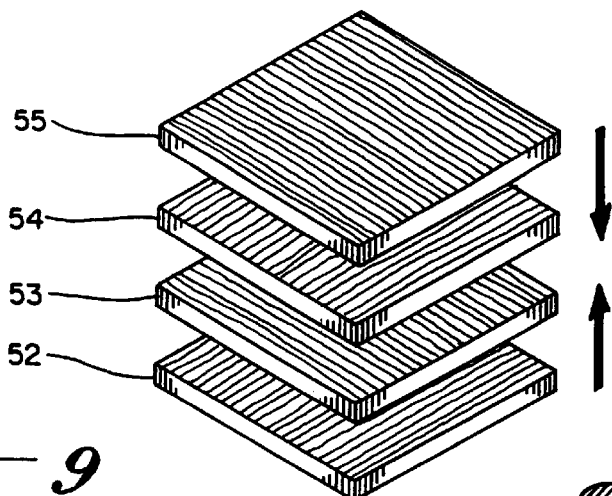
FIG. 9 is an exploded view of the layers in the crown preform.
Figure 10:
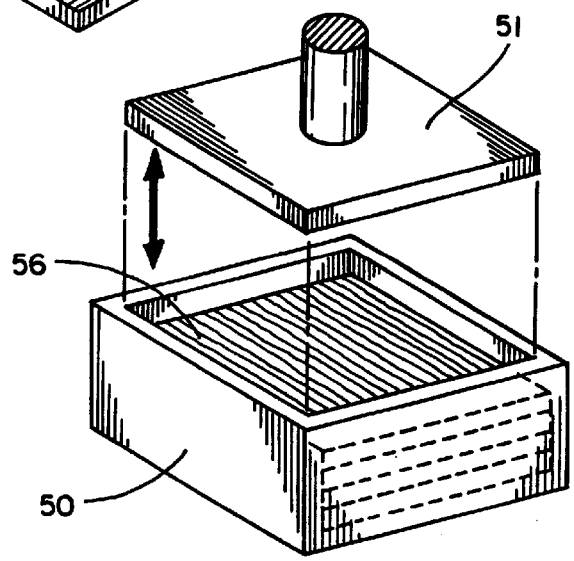
FIG. 10 is an exploded view of a compression mold forming the crown preform.

Skirt 16 has a cross bore 35 there-through for receiving the wrist pin 18, and it has spaced annular grooves 37 and 38 therein for receiving snap rings 40 for holding the wrist pin in position. Snap rings 40 fit into spaced annular recesses 42 in the wrist pin 18, as seen in FIG. 7.

The processes for fabricating the sleeve 11, the piston 12, and the wrist pin 18, will be described as follows in conjunction with FIGS. 9, 10, 11 and 12.

The preform for the crown 14 is fabricated in a compression mold 50 having an upper pressure platen 51. In one method to achieve high thermal conductivity and high temperature strength, the carbon fibers are layered with a pitch matrix in mold 50, as indicated by layers 52, 53, 54, 55, etc. The fibers in each layer are orthogonally related to the fibers in the adjacent layers.

Alternatively, the mold 50 can be filled with chopped fibers in a pitch matrix in any orientation desired. It should be understood that the fibers in the crown preform 56 are generally perpendicular to the axis of the final piston assembly 12. The fiber orientation in the preform 56 can be tailored for a particular engine; for example, the crown fiber orientation for gasoline engines are positioned for high thermal conductivity and for lower conductivity in diesel applications. The crown preform 56 is heated in a compression molding machine associated with mold 50 to about 600 degrees C. The preform 56 is thereafter cracked by pyrolization in a furnace at 1500 to 2000 degrees C.

The crown is then machined from the preform 56 utilizing conventional machining techniques.

The piston parts, as well as the liner 11 and the wrist pin 18, can be coated if desired based on requirements to increase their performance characteristics by a CVD of carbon, SiC, $Si_3N_4$, or by electrolytic deposition of metals and their compounds such as Ni or Cu or by sol gel and other commercially available coatings.

Figure 11:
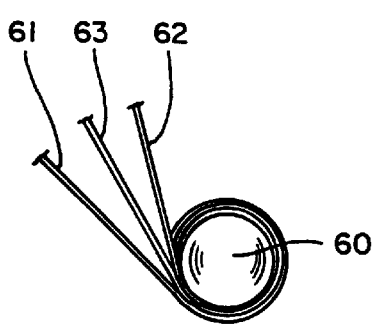
FIG. 11 is an end view of a mandrel upon which the carbon fibers are layered to form the piston skirt and wrist pin.
Figure 12:
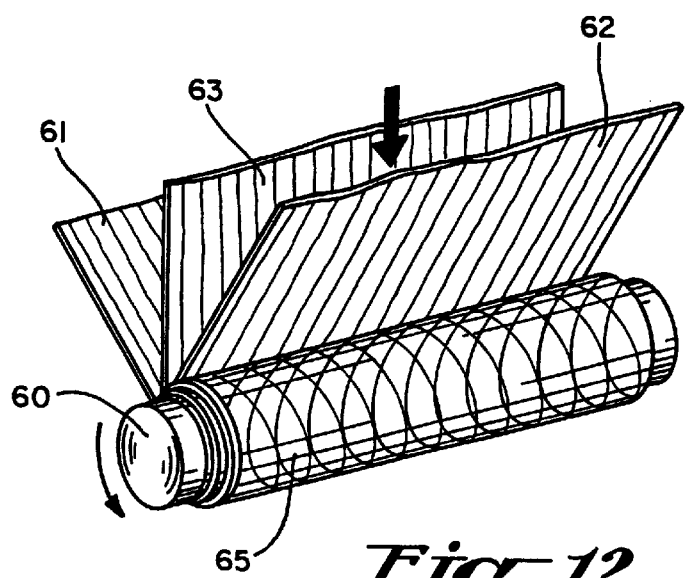
FIG. 12 is a perspective view of the mandrel wrapping illustrated in FIG. 11.

Preforms for the cylinder sleeve 11, the skirt 16, and the wrist pin 18, are formed by wrapping on a mandrel, such as mandrel 60, illustrated in FIGS. 11 and 12.

In one method illustrated in FIGS. 11 and 12, a fiber sheet 61 is directed to the mandrel at $^+45$ degrees while fiber sheet 62 is directed at the mandrel at $^-45$ degrees, and fiber sheet 63 is directed at the mandrel at 0 degrees. The fibers in each layer or sheet run longitudinally in the sheets as shown.

Building the sleeve preforms from a bobbin-like mandrel enables a hybrid of fiber additions, such as stabilized PAN, PAN, low temperature pitch or high temperature pitch fiber in such a way to tailor the properties for specific strength, thermal conductivity, thermal expansion, etc. Chopped fibers may also be used with the mandrel technique by applying the chopped fibers uniformly to sheeting.

This mandrel process can be done in a machine similar to a lathe so that the sleeves are fabricated uniformly and rapidly with consistent quality. The resulting preform 65 can be preheated if desired on the mandrel 60 to stretch the fibers in the preform, which increases high heat strength for the resulting part.

Thereafter, the preforms are placed in a furnace and heated at 600 to 800 degrees C. for the final cure removed from the mandrel 60.

The cylinder sleeve 11 and the skirt 16 have their preforms 65 made in exactly the same way, and are cured for the same time at the same temperature to achieve the optimum matching of piston skirt to cylinder sleeve. This technique minimizes the required piston-cylinder clearance by minimizing differential thermal growth between the piston and the cylinder sleeve.

The piston is assembled by threading the crown 14 to the skirt 16 with a binder such as pitch, phenolic or any high temperature resin. These parts are subsequently heat treated in the range of 400 to 1000 degrees C. depending upon the nature of the binder and the requirements. Subsequent to this assembly, the piston is further machined with wrist pin bore 35 and grooves 20, 25. A separate heat treatment of the skirt results in a cost reduction because is is no longer required to be made to the high temperature requirements of the crown. Because the piston is made in two parts, the smaller preforms are simpler and faster to heat treat and CVD, if necessary. Also as noted above, different crowns and different skirts can be interchanged to provide a variety of products having different characteristics for different applications; i.e., a custom assembly system. It is also easier to create combustion bowl and valve relief on the piston crowns because of this fabrication method.

Furthermore, the piston rings 23 and 24 can be moved upwardly compared to aluminum piston technology for reduced blow by improved ring pack, and reduced clearance volume. This carbon—carbon assembly enables the engine to run lean, and as a result of the reduced weight, considerable horsepower will be realized with improved thermal efficiency, improved fuel consumption, and reduced emissions.

I claim:

1. A method of making a carbon—carbon piston, including the steps of: forming a crown preform of carbon fiber and binder while controlling the fiber orientation, pyrolyzing the crown preform, and machining the crown preform to form a crown, forming a skirt preform of carbon fiber and binder while controlling the fiber orientation, pyrolyzing the skirt preform, forming the skirt preform to form a skirt, and assembling the crown and skirt.

2. A method of making a carbon—carbon piston including the steps of: forming a crown preform of carbon fiber and binder, pyrolyzing the crown preform at a temperature in the range of about 1500 to 2000 degrees C. for high thermal conductivity and high temperature strength, forming a crown from the crown preform, forming a skirt preform of carbon fiber and binder, pyrolyzing the skirt preform at a temperature substantially below the temperature at which the crown preform is pyrolyzed, forming a skirt from the skirt preform, and assembling the crown and skirt to form a piston.

3. A method of making a carbon—carbon piston as defined in claim 2, wherein the step of forming the crown preform includes layering fiber in a preform mold and compressing the fiber and binder in the mold.

4. A method of making a carbon—carbon piston as defined in claim 2, wherein the step of forming the crown preform includes blowing chopped fibers into a preform mold and compressing the fibers and binder in the mold.

5. A method of making a carbon—carbon piston as defined in claim 2, wherein the step of forming the skirt preform includes wrapping the fibers on a mandrel about an axis the same as the axis of the resulting piston.

6. A method of making a carbon—carbon piston as defined in claim 5, wherein the step of forming the skirt preform includes heating the wrapped mandrel to stretch and strengthen the fibers.

7. A method of making a carbon—carbon piston as defined in claim 5, wherein the step of forming the skirt preform includes wrapping layers of fibers on the mandrel at different angles to the axis of the mandrel.

8. A method of forming a piston and cylinder sleeve having similar coefficients of expansion, including the step of forming a piston preform of carbon fiber and binder, forming a cylinder sleeve preform of carbon fiber and binder, and pyrolyzing the piston preform and the cylinder preform at about the same temperature and time to achieve substantially the same coefficients of expansion, and forming a piston from the piston preform, and forming a cylinder sleeve from the cylinder sleeve preform.

9. A method of forming a piston and cylinder sleeve as defined in claim 8, wherein the step of pyrolyzing the piston preform and pyrolyzing the cylinder sleeve preform takes place at a temperature in the range of about 600 to 1000 degrees C.

10. A method of forming a piston and cylinder sleeve as defined in claim 8, wherein the steps of forming the piston preform and the step of forming the cylinder preform both include wrapping the fibers on a mandrel in the same orientation to achieve similar properties in the piston and the cylinder sleeve.

11. A method of forming a piston and wrist pin having similar coefficients of expansion, including the step of forming a piston preform of carbon fiber and binder, forming a wrist pin preform of carbon fiber and binder, and pyrolyzing the piston preform and the cylinder preform at about the same temperature and time to achieve substantially the same coefficients of expansion, and forming a piston from the piston preform, and forming a wrist pin from the wrist pin preform.

12. A method of forming a piston and wrist pin as defined in claim 11, wherein the step of pyrolyzing the piston preform and pyrolyzing the wrist pin takes place at a temperature in the range of about 600 to 1000 degrees C.

13. A method of forming a piston and wrist pin as defined in claim 11, wherein the steps of forming the piston preform and the step of forming the wrist pin both include wrapping the fibers on a mandrel in the same orientation to achieve similar properties in the piston and the wrist pin.

* * * * *